United States Patent [19]

McEntee et al.

[11] Patent Number: 4,797,810
[45] Date of Patent: Jan. 10, 1989

[54] INCREMENTAL, MULTI-AREA, GENERATIONAL, COPYING GARBAGE COLLECTOR FOR USE IN A VIRTUAL ADDRESS SPACE

[75] Inventors: Timothy J. McEntee, Garland; Robert W. Bloemer, Dallas; Donald W. Oxley, Carrollton; Satish M. Thatte, Richardson, all of Tex.

[73] Assignee: Texas Instruments Incorporated, Dallas, Tex.

[21] Appl. No.: 878,551

[22] Filed: Jun. 26, 1986

[51] Int. Cl.[4] .............................................. G06F 11/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,121,286 | 10/1978 | Charles et al. | 364/200 |
| 4,471,429 | 9/1986 | Porter et al. | 364/200 |
| 4,660,130 | 4/1987 | Bartley et al. | 364/200 |
| 4,685,082 | 8/1987 | Cheung et al. | 365/49 |
| 4,695,949 | 9/1987 | Thate et al. | 364/200 |

OTHER PUBLICATIONS

Bishop, Peter B., Garbage Collection in a Very Large Address Space, Working Paper III, Sep. 1975, MIT.
Moon, David A., Garbage Collection in a Large Lisp System, 1984, ACM 0-89791-142-3/84/008/0235, pp. 235-246.
Unger, David, Generation Scavenging:A Non-Disruptive High Performance Storage Reclamation Algorithm, 1984, ACM 0-89791-131-8/84/6400/6197, pp. 157-167.

Primary Examiner—Archie E. Williams, Jr.
Assistant Examiner—Ayni Mohamed
Attorney, Agent, or Firm—Thomas G. Devine; James T. Comfort; Melvin Sharp

[57] ABSTRACT

An incremental garbage collector for use in conjunction with a virtual memory, operates on selected generations of an area upon objects which are contained in a semispace, oldspace or newspace, and during the garbage collection process, all accessible objects are copied from the oldspace to the newspace. The garbage collection process occurs in four phases. In the "flip" phase oldspace and newspace of each generation are exchanged. In the "trace" phase, the pointers which are part of a root set of the generation being collected are traced and all oldspace objects referenced by the pointers are copied to newspace, and the pointers in the root set are updated. All copied objects are then "scavenged" to update any pointers in the cells of the copied objects, and to copy to newspace all oldspace objects referenced by those pointers. Finally a "cleaning oldspace" phase is performed as a low-priority background process to purge the entries for the virtual pages on which "obsolete" pointers reside.

11 Claims, 6 Drawing Sheets

INCREMENTAL, MULTI-AREA, GENERATIONAL, COPYING GARBAGE COLLECTOR FOR USE IN A VIRTUAL ADDRESS SPACE

BACKGROUND OF THE INVENTION

1. Field of the Invention

This invention relates to improvements in methods and apparatus for allocating and reclaiming memory in symbolic processing type systems, and more particularly to methods and apparatus relating to incremental, multi-area, generational, copying garbage collection in a virtual address space which can be associated with an artificial intelligence engine, or the like.

2. Description of Related Art Including Information Disclosed Under §§1.97-1.99

The method and apparatus of the invention has particular application to systems which use symbolic processing languages and techniques. In the past, memory spaces associated in the operation of such computer systems were relatively small, and the reclamation of memory space, referred to as "garbage collection" was not a significant problem. Generally, when the memory was in need of garbage collection, the CPU processes were stopped, or "paused", and a garbage collection process was performed. However, as larger and larger memories are possible of implementation, and recent interest in very large memory operations, such as artificial intelligence applications, have been receiving more and more attention, the problems associated with garbage collection have become of greater importance.

In approaches to this problem, pausing garbage collectors have been advanced, usually with the accompanying assumption that there will be times when pauses in the CPU processes could be tolerated. Again, however, when larger memories, such as memories of $2^{26}$ or $2^{32}$ words have been considered, collection of the entire memory takes sometimes minutes, or even hours to complete. (It has sometimes been assumed that the system operator may "go home" at night, and during that period of inactivity, the garbage collection process could be run on larger systems.)

In efforts to minimize the delay effects of such garbage collection on the system operation, it has been proposed to create "generations" of work, with progressively older generations being defined, then pausing the CPU operation to collect certain generations, so that the entire memory is not collected at one time. This has resulted in garbage collection "pauses" of lesser time, but noticeable pauses still result.

In efforts to achieve "real-time" garbage collection, it has been proposed to divide the memory into two semispaces, often referred to as "oldspace" and "newspace", and to copy all the non-garbage objects from the oldspace to the newspace. A forwarding address is left at the old location, in oldspace, of a copied object. Whenever a pointer is followed which points to an object containing a forwarding address, the pointer is updated to point to the copied object. The processor is shared among the CPU processes and the garbage collection process. Collection is complete when all reachable objects have been copied to newspace. Again, however, the collection process on the entire memory is inefficient, and often requires unnecessarily moving memory contents.

It has also been proposed to define a number of different areas in the memory, and to collect only one area at a time to achieve more realistic "real-time" collection. These attempts also have significant disadvantages.

SUMMARY OF THE INVENTION

In light of the above, therefore, it is an object of the invention to provide a garbage collector and process which operates on an area-by-area basis.

It is an object of the invention to provide an incremental, "generational" garbage collector and process, as opposed to a "pausing" collector.

It is another object of the invention to provide a garbage collector which copies all accessible objects from an oldspace to a newspace of the same generation or of the next older generation in the same area and which updates all pointers to the oldspace objects in the generation under collection to reference the identical copy of the object in newspace.

It is another object of the invention to provide a process for "tenuring", or promoting from one generation to an older generation objects which have survived several garbage collections, and, therefore, which will not likely be reclaimed by the collector in the foreseeable future.

It is another object of the invention to provide a garbage collection process of a generation which occurs in four phases, the flip, trace, scavenge, and oldspace cleanup phases.

It is another object of the invention to provide a "trouble pointers list" or "TPL" associated with each generation of each area to keep track of inbound "trouble" pointers to the generation, and to provide a means to trace the "trouble" pointers to the generation.

It is another object of the invention to provide a method for scavenging all objects which are copied to newspace to find and update any pointers in cells of newspace objects, as well as to copy all oldspace objects to newspace which are referenced by those pointers.

In accordance with a broad aspect of the invention, a garbage collector is presented for use in conjunction with a virtual memory, for example, of a symbolic processor or the like. The garbage collector and the virtual memory processes can act on memory concurrently; consequently, the garbage collector operates incrementally in distinction to "pausing" collectors. The garbage collector operates on an area-by-area basis upon objects which are contained in one of two semispaces, oldspace or newspace, and during the garbage collection process, all accessible objects are copied from oldspace to newspace.

A forwarding address is left at the old location of a copied object in oldspace. Whenever a pointer is followed which points to an object containing a forwarding address, the pointer is updated to point to the copied object. Collection is complete when all reachable objects have been copied to newspace, and all pointers to the oldspace objects are updated so that they reference the copy of the object in newspace.

When an object is copied from oldspace to newspace, a forwarding pointer is created in the object in oldspace pointing to the location of the copied object in newspace. When other references are followed to the object in oldspace, the forwarding pointer indicates that the object is not to be copied; instead, the reference is replaced with the value of the forwarding pointer.

The garbage collector is generational, each area in the virtual address space being divided in up to four generations, with the youngest generation being the most volatile and resident in the main computer memory. For each generation, a "root set", a group of pointers which originate in the associated CPU registers and other generations referencing objects in the generation, are identified. A list of the non-register pointers is maintained in a "trouble pointers list" or "TPL" for each generation.

During the copying of objects from oldspace to newspace, objects are "tenured" or promoted from one generation to an older generation. An object is "tenured" or promoted when it has survived a predetermined number of garbage collections, thereby demonstrating that it likely will not be reclaimed by the collector in the immediate future.

The garbage collection process of the invention occurs in four phases, "flip", "trace", "scavenge", and "oldspace cleanup" phases. In the "flip" phase oldspace and newspace of each generation are exchanged or renamed. In the "trace" phase, the pointers which are part of the root set of the generation being collected are traced to identify and copy all oldspace objects in a generation which are directly referenced by pointers identified by the root set, and to update all pointers in the root set so that they point to objects in newspace identical to the objects in oldspace they referenced right after the "flip". After tracing, all objects which were copied to newspace during the trace phase are "scavenged" in order to find and update any pointers in the cells of the newspace objects, as well as to copy all oldspace objects to newspace which are referenced in the transitive closure from those pointers. Once the newspace of the generation is scavenged, the promoted objects in the next older generations are scavenged.

After the scavenge phase is complete the "cleaning oldspace" phase is performed as a low-priority background process to purge the entries for the virtual pages on which "obsolete" pointers reside.

BRIEF DESCRIPTION OF THE DRAWING

The invention is illustrated in the accompanying drawing, wherein.

In the various figures of the drawing, like reference numerals are used to denote like or similar parts.

DETAILED DESCRIPTION OF THE PREFERRED EMBODIMENT(S)

A system with which the invention may be used is a typical LISP system. Thus, as is known in the art, a pointer to an object originates either from a memory cell or from a register of the CPU.

Figure 1:
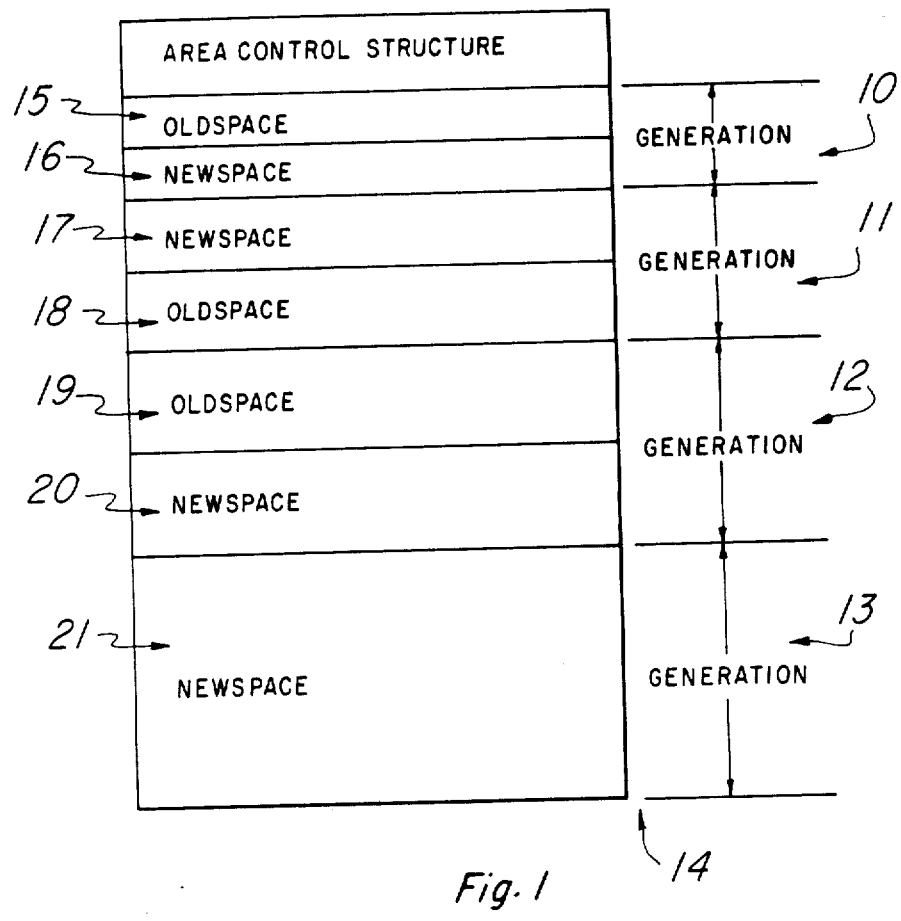
FIG. 1 is a representation of an area in a virtual address space with which the method and apparatus in accordance with the invention can be used, showing the manner in which generations are allocated within the area.

The garbage collector of the invention operates incrementally on selected "generations" in individual areas of memory. Thus, as shown in FIG. 1, a number of generations, for example, four generations 10-13, as shown, exist in an area 14, the youngest generation 10 occupying a much smaller percentage of the area than the next older generation 11, and so on. The youngest generation 10 preferably resides in main memory, along with the youngest generations of other areas (not shown). Since the youngest generation 10 is generally the most volatile and contains the greatest amount of garbage, it is garbage collected more frequently than the older generations 11-13, and garbage collection can be completed more quickly if it is in main memory.

Each generation has two semispaces, oldspace and newspace, and during garbage collection, all accessible objects are copied from oldspace to newspace. A forwarding address left at the oldspace location of a copied object points to its new location, and pointers which point to an object containing a forwarding address are updated to point to the new location. For example, generation 10 has an oldspace 15 and a newspace 16. Likewise, generations 11 and 12 have oldspaces and newspaces 17-20, as shown. Generation 13 has only a newspace 21.

Figure 2:
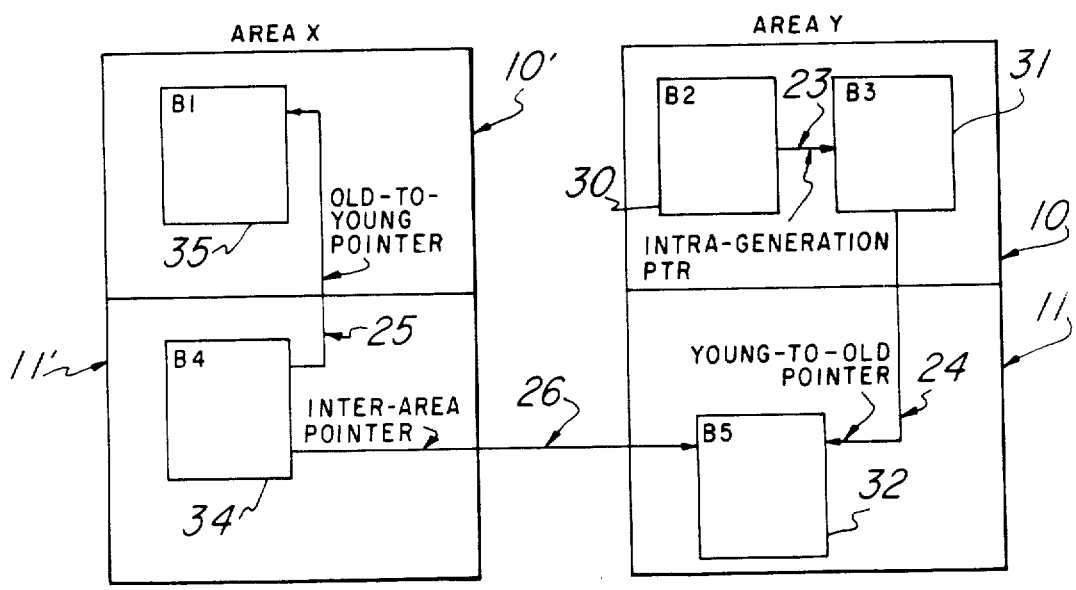
FIG. 2 is a representation of a virtual address space with which the method and apparatus in accordance with the invention can be used, illustrating the various pointer structures which can exist.

In a system with which the invention can be used, four types of pointers exist, as shown in FIG. 2. To illustrate the pointer types, two areas, Area X and Area Y, are shown, each having two generations 10 and 11, and 10' and 11', respectively. The pointers are, from most to least prevalent, the intra-generation pointer 23, the young-to-old pointer 24, the old-to-young pointer 25, and the inter-area pointer 26. The intra-generation pointer 23 points from a cell in one object 30 to another object 31 in the same generation 10. The young-to-old pointer 24 points from a cell in an object 31 to an object 32 in an older generation 11 in the same area Y. The old-to-young pointer 25 points from a cell in an object 34 to an object 35 in a younger generation 10' in the same area X. The inter-area pointer 26 points from a cell in an object 34 in one area X to an object 32 in a different area Y. An inter-area pointer is further referred to as "inbound inter-area pointer" if it points into an area, and as an "outbound inter-area pointer", if it points out of the area. (Pointers originating in CPU registers having none of the designations listed above, are treated as intra-generation pointers.)

Each generation has a "root set" of pointers, that is, the set of pointers, other than intra-generation pointers, which reference objects in the particular generation. Thus, pointers in the registers of the CPU and inter-area pointers which point into a particular generation are a part of its root set, as well as pointers originating from other generations in the same area. Since the old-toyoung and inter-area pointers of the "root set" often require updating when they are accessed, they are termed "trouble" pointers, and are identified in a list, called a "Trouble Pointers List", or simply "TPL", each generation having an associated "TPL", below described in detail. Young-to-old pointers are not included in the TPL because young-to-old pointers outnumber the old-to-young pointers, and the size of the TPL can be reduced if young-to-old pointers are not stored there. This can be done if, whenever any particular generation is garbage collected, all younger generations are also collected, so that objects pointed to by young-to-old pointers will be discovered during the "scavenging" of objects in the younger generations, as below described.

Figure 3:
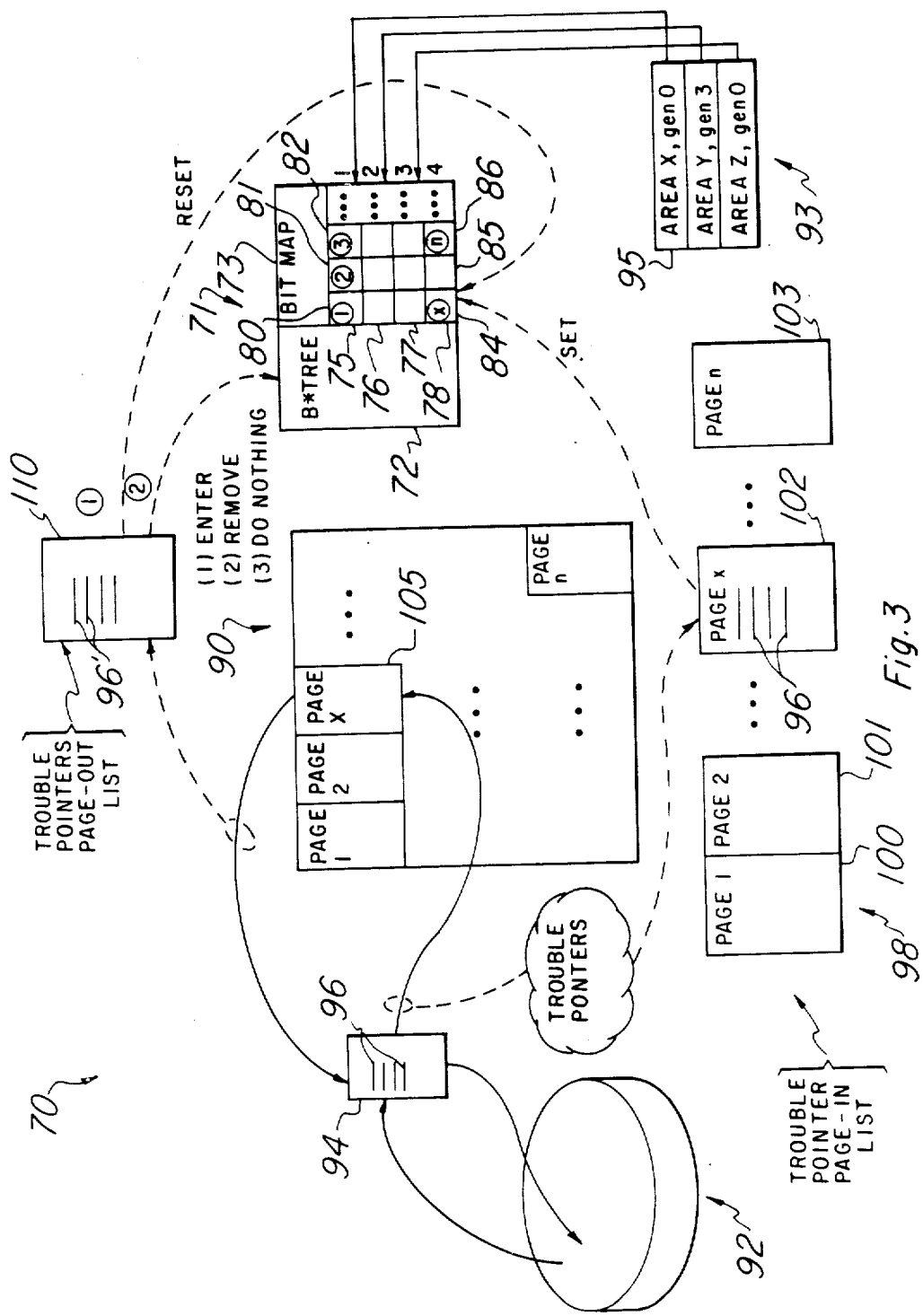
FIG. 3 is an illustration showing the structure of the "trouble pointers list" (TPL) and its relationship and operation in combination with main and disk memories, in accordance with the invention.

With reference now to FIG. 3, an illustration of a portion of a memory system 70, and the process by which it is managed to enable incremental garbage collection in accordance with the invention is illustrated. The TPL 71 is made up of two parts, a "B*-tree" 72, and a bit-map 73. B*-trees and bit-maps are known in the art and are not described in detail herein. The B*-tree 72 has entries for all pages not in main memory 90 which contain one or more "trouble" pointers. It also contains entries for pages in main memory 90 which had one or more "trouble" pointers to the generation at the time the page was brought in to main memory 90 from disk 92 (since it is possible that "trouble" pointers may have been destroyed since the page was brought in.)

The bit-map 73 can be either an "assigned" map or a default map, or both. For illustration, three assigned bit-maps 75, 76, 77 and one default bit-map 78 are shown. Generations to which one of the bit-maps 75, 76, or 77 has been assigned are those determined by the operating system to be "active" generations. There are a limited number of active generations (three, for instance, being shown), and a generation will not necessarily remain active forever. The operating system uses such criteria as the frequency of allocation in a generation and the number of pages the generation has occupied in main memory 90. When a generation achieves "active" status, one of the three assigned bit-map TPL 75, 75, or 77 is assigned to it. Otherwise, the default bit-map 78 of the TPL is used for the generation associated with it.

Each assigned bit-map TPL 75–77 of an active generation has a bit for each page in main memory 90. Thus, for example, the assigned bit-map 75 has bits 80, 81, 82, etc., one for each page of the active generation with which it is associated. If a bit is turned on, it signifies that the corresponding main memory page may have one or more "trouble" pointers which reference the generation associated with the respective bit-map TPL 73. It is possible that no such pointers currently exist. For instance, if a page was brought in to main memory 90, at least one "trouble" pointer originating in the page referenced the generation of the bit-map TPL 73, but all "trouble" pointers to the generation may have since been written over since the page was brought in.

The default bit-map TPL 78 similarly has a bit 84, 85, and 86 for each page in main memory 90. If a bit is turned on, however, it signifies that when the page was brought in to main memory 90, one or more trouble pointers referenced one or more inactive generations.

If a bit in a bit-map TPL is turned off, the corresponding main memory page has no outbound "trouble" pointers to the generation of the bit-map TPL. In the case of the active generation bit-map TPLs, this means no "trouble" pointers reference its respective generation. In the case of the default bit-map TPL, this means no "trouble" pointers reference any non-active generation.

When tracing the "trouble" pointers begins (as below described in detail), the first step is to identify the bit-map TPL associated with the particular generation under collection. This is done by searching Active Generations table 93. The Active Generation table 93 shown is an associative look-up table containing the area and generation number of the presently active generations, as shown.

If the generation about to enter the trace phase is identified in the Active Generations Table 93, the table 93 is used to identify and locate the assigned bit-map TPL 75–77 for that generation. For example, an entry 95 for generation 0 of Area X is shown as an active generation in the Active Generation Table 93, and it is assigned the first bit map 75 of the bit-map TPL 73. On the other hand, if the generation were not to be found in the Active Generation Table 93, its bit-map TPL would be the default bit-map 78. For example, generation 2 of Area X is not active, so its bit-map TPL is the fourth bit map 78 of the bit-map TPL 73.

In order to maintain the TPL 71, when a virtual page 94 from disk 92 is brought in to main memory 90, the page 94 is scanned for "trouble" pointers 96. Each instance of a "trouble" pointer 96 is entered on a Trouble Pointer Page-in List for that physical page. More particularly, a Trouble Pointer Page-in List 98 is provided, one list 100–103 being provided to correspond to each page of main memory 90. Thus, as shown, when page 94 is scanned, as it is being paged in to occupy Page X 105 of main memory 90, any trouble pointers on the page 94 are copied into the list 102 of the Trouble Pointer Page-in List 98 corresponding to Page X 105 of main memory.

It is important that the number of "trouble" pointers is minimal (as expected), since the Trouble Pointer Page-in Lists, one for each main memory page, will also occupy pages resident in main memory 90. Of course, this space can be minimized by permitting only a limited number of the Trouble Pointer Page-in Lists 100–103 to reside in main memory 90, the rest being kept on disk 92, and paged in, as necessary.

As the trouble pointers on the page 94 are listed on list 102, their existence is also noted on the appropriate bit-map of the bit-map TPL 73.

On the other hand, when a page is paged-out, the page is scanned again, and a temporary list of "trouble" is made and sorted. Thus, for example, as shown, when page 94 is written to disk 92, the pointers 96' on the page are noted on a Trouble Pointers Page-out List 110. Then, the pointers listed on the Trouble Pointers Page-out list 110 are compared to the entries which were made on the list 102 of the Trouble Pointers Page-in list 98 when the page 94 was paged in earlier. In accordance with the reconciliation, (1) pointers which are in both lists will cause no changes in the B*-tree 72 of the TPL 71; (2) a pointer which is in the Trouble Pointer Page-in List 98 and not in the Trouble Pointers Page-out List 110 are purged from the B*-tree 72 of the TPL 71, since the "trouble" pointer which existed at page-in time has since been written over; and (3) a pointer which is not in the Trouble Pointer Page-in List 98, but is in the Trouble Pointer Page-out List 110 is added to the B*-tree 72 of the TPL 71. It will be apparent to those skilled in the art that the process described above greatly simiplifies and enables the efficient process of keeping track of trouble pointers so that the trouble pointers can be easily updated in the page-in, page-out process.

Lastly, the bit 84 corresponding to the page 94 being written to disk 92 is turned off or reset in the appropriate bit-map TPL 78 of the TPL 73.

Garbage collection, in accordance with the invention, occurs in four phases, the "flip", "trace", "scavenge", and "oldspace cleanup" phases. In the "flip" phase, what had been newspace prior to the collection becomes an oldspace, and oldspace becomes an empty newspace. This occurs not only for the generation being collected, but for all younger generations in the same area as well. If the oldest generation (for example, generation 13 in FIG. 1) is to be garbage collected, a new portion of the virtual address space is allocated. The newspace of the oldest generation in the existing area then becomes oldspace and the newly portioned part of the virtual address space becomes its newspace. Newspace for the younger generations are also apportioned in the new portion of the area.

Figure 4:
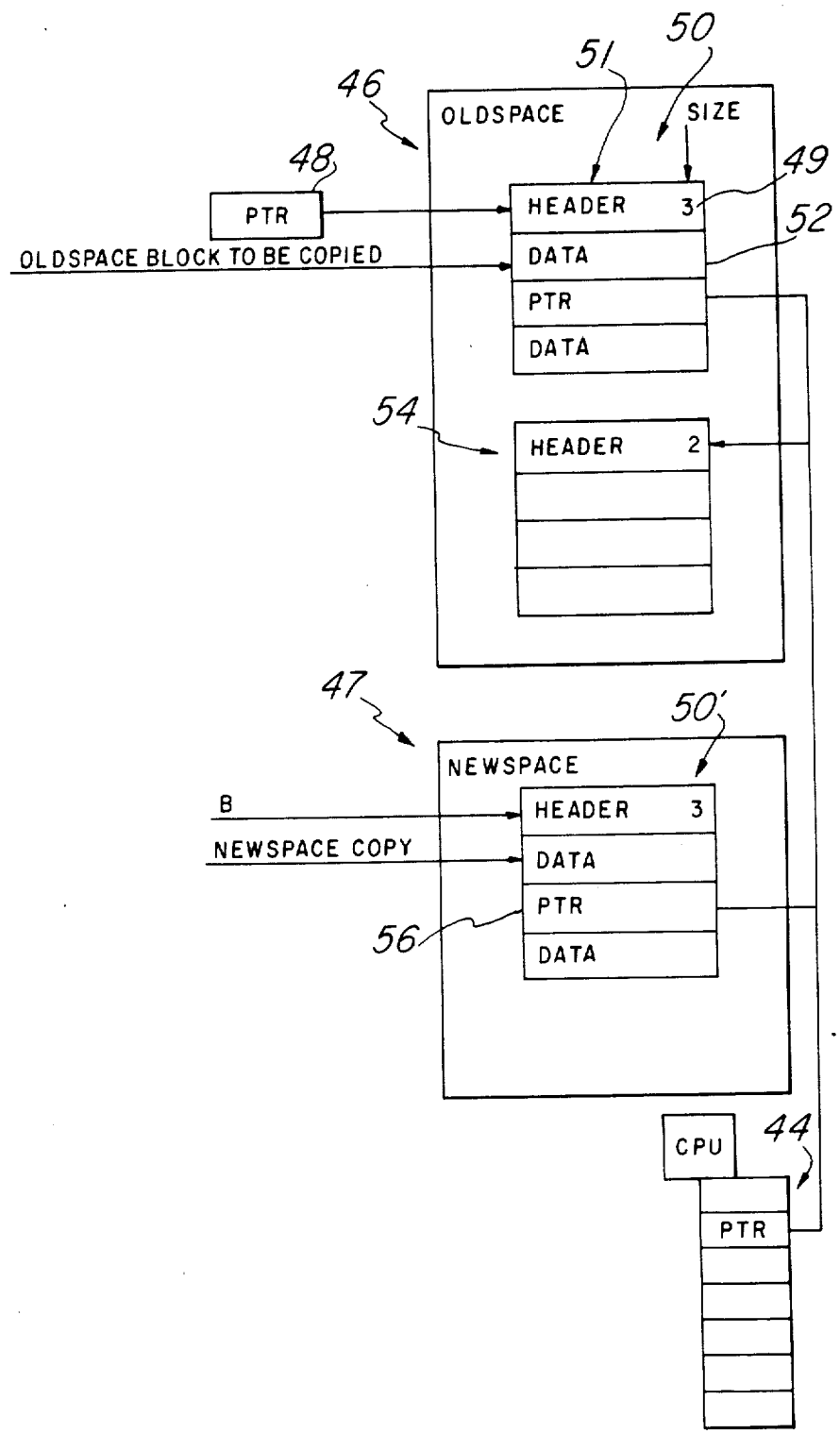
FIG. 4 shows a portion of an area of a virtual address space with which the method and apparatus in accordance with the invention can be used, including both the oldspace and newspace of a generation and the manner by which a block is copied from oldspace to newspace, in accordance with the invention.

With reference now to FIG. 4, after the "flip" the garbage collector copies all the accessible objects in an oldspace 46 to a newspace 47 of the same generation, as shown, or of the next older generation (not shown) in the same area (if "tenured", as below described), and once underway, the object copying process is not interrupted by user processes, except page faults. First, the pointers which are part of the root set of the generation being collected are traced to identify all oldspace non-garbage objects to be copied. First, all pointers from the CPU registers 44 which reference objects in the generation(s) being garbage collected are followed, any uncopied objects are copied, and the registers containing pointers pointing into the generation(s) are updated to point to the newspace copies. During this portion of the trace, the CPU processes are denied access to memory, but once CPU registers have been traced, the CPU processes are again permitted to access memory with the garbage collector concurrently; that is, incremental garbage collection begins. Then, the remaining pointers of the root set are traced. After the objects are thus copied to newspace 47, the pointers in the root set are updated to reference the newspace copy of the object.

To trace the remaining pointers of the root set, once the correct bit-map TPL 75-77 (FIG. 3) has been selected, as above described, it is traversed looking for bits which are on. As each "on" bit is found, the corresponding page in main memory 90 is scanned. Each pointer cell in the page which references a block in the generation under collection, for example, a reference to a block in the same area as the area of the generation and with the generation number in the pointer structure of the pointer matching the generation, is traced in the same way that the CPU registers 44 are traced. Thus, all pointers on the page referencing blocks in oldspace are updated to point to the newspace copies of the blocks. There may be no such pointers in the scanned page, but no page fault will occur since the page is already in memory. If no such pointers are found in the page, the bit is turned off; otherwise, it remains on.

Following the traversal of the bit-map TPL 73, the B*-tree TPL 72 is used to find "trouble" pointers to the generation which are not resident in main memory 90. The page corresponding to each entry of the B*-tree 72 is scanned in the same way they were scanned for the bit-map 73. Several pages containing "trouble" pointers may have to be paged in, but any that are paged in are guaranteed to have at least one "trouble" pointer that requires tracing. When the entire B*-tree 72 has been traversed, the tracing of "trouble" pointers phase is complete.

To further identify non-garbage objects in the oldspace 46 which should be copied, all objects which are copied to newspace 47 during the trace phase are "scavenged" to find and update any pointers which may exist in the cells of the newspace objects, as well as to copy to newspace all oldspace objects which are referenced by those pointers and which have not been previously copied.

Thus, when an object, such as the object 50 in FIG. 4 is identified by a pointer, such as the pointer 48, it is copied from oldspace 46 to newspace 47 as follows. The size of the object 50 is determined from a value in an "object-size" field 49 in a header cell 51 of the object 50, and the correct number of words of memory are allocated in the newspace 47. The virtual address of the first cell of an allocated words of memory where the object 50 will be located in newspace 47 is identified by a pointer, "B", and each cell of the object 50 is copied. As the object 50 is copied, the outbound "trouble" pointers are detected, and when a "trouble" pointer is copied, this fact is noted in the TPL associated with the generation being referenced by the copied pointer (not shown).

Figure 5:
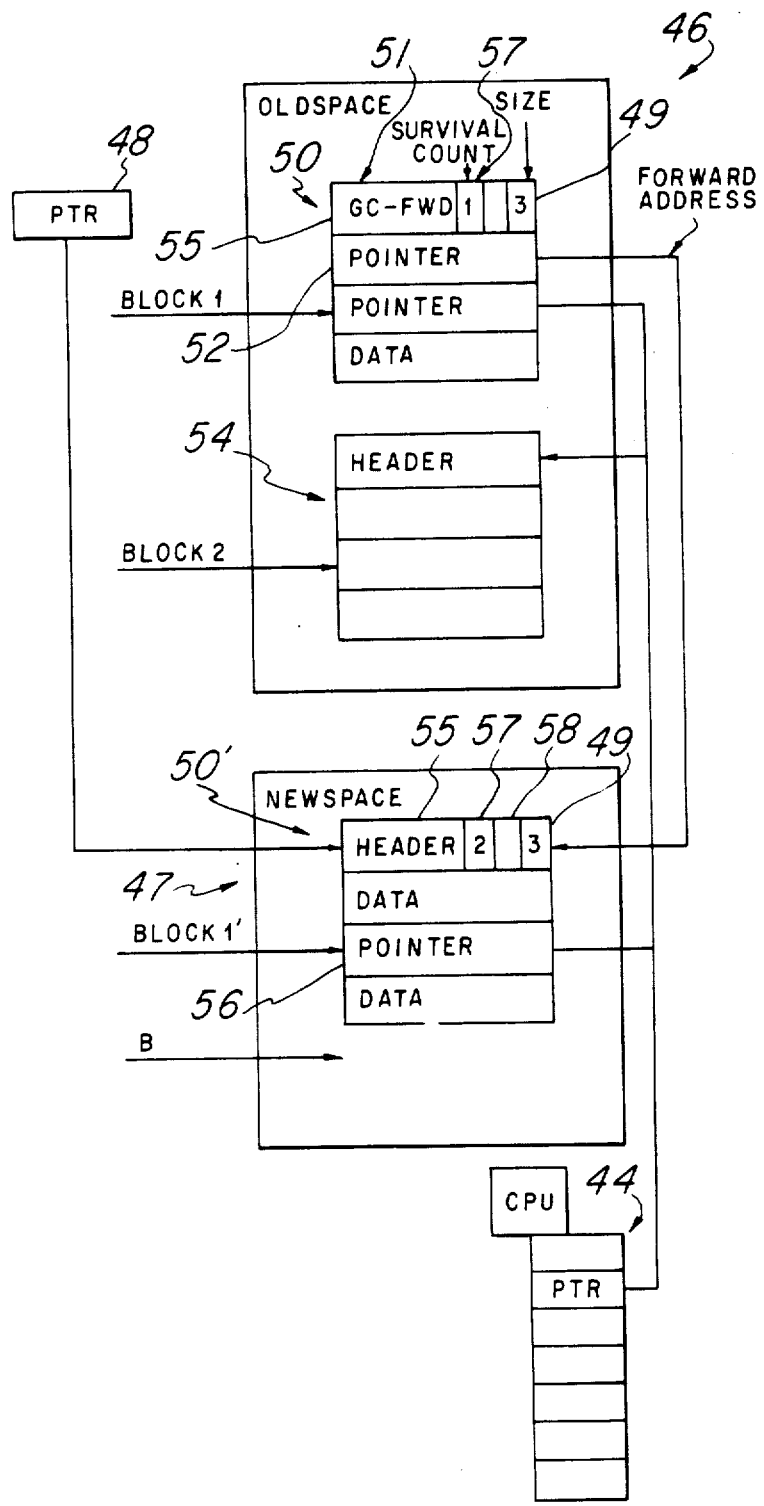
FIG. 5 shows a portion of the area of a virtual address space of FIG. 4 showing the manner by which the updating of the references which point to the oldspace block is enabled.

After the object 50 has been copied, the references which point to the oldspace copy of the object 50 are updated as they are encountered. The manner in which this is enabled is illustrated with reference now to FIG. 5. First, the value in a data field cell 52 is replaced with a pointer to the virtual address of the copied object 50' in newspace. This is the "forwarding address" of the copied object 50'. If the object is copied to the newspace of the next older generation, the generation number contained in the memory tag of the pointer is also incremented.

With reference again to FIG. 5, after the object 50 is copied to the appropriate newspace, a flag, referred to as a "gc-forward" is placed in a cell 55 of the header 51 of the object 50 in oldspace 46. Thereafter, when other references are followed to the object 50 in oldspace 46, the "gc-forward" in cell 55 indicates that the object 50 is not to be copied, but instead, the reference is to be replaced with the contents of cell 52 of the oldspace object 50, the forwarding address of the copied object 50' in the newspace 47.

Figure 6:
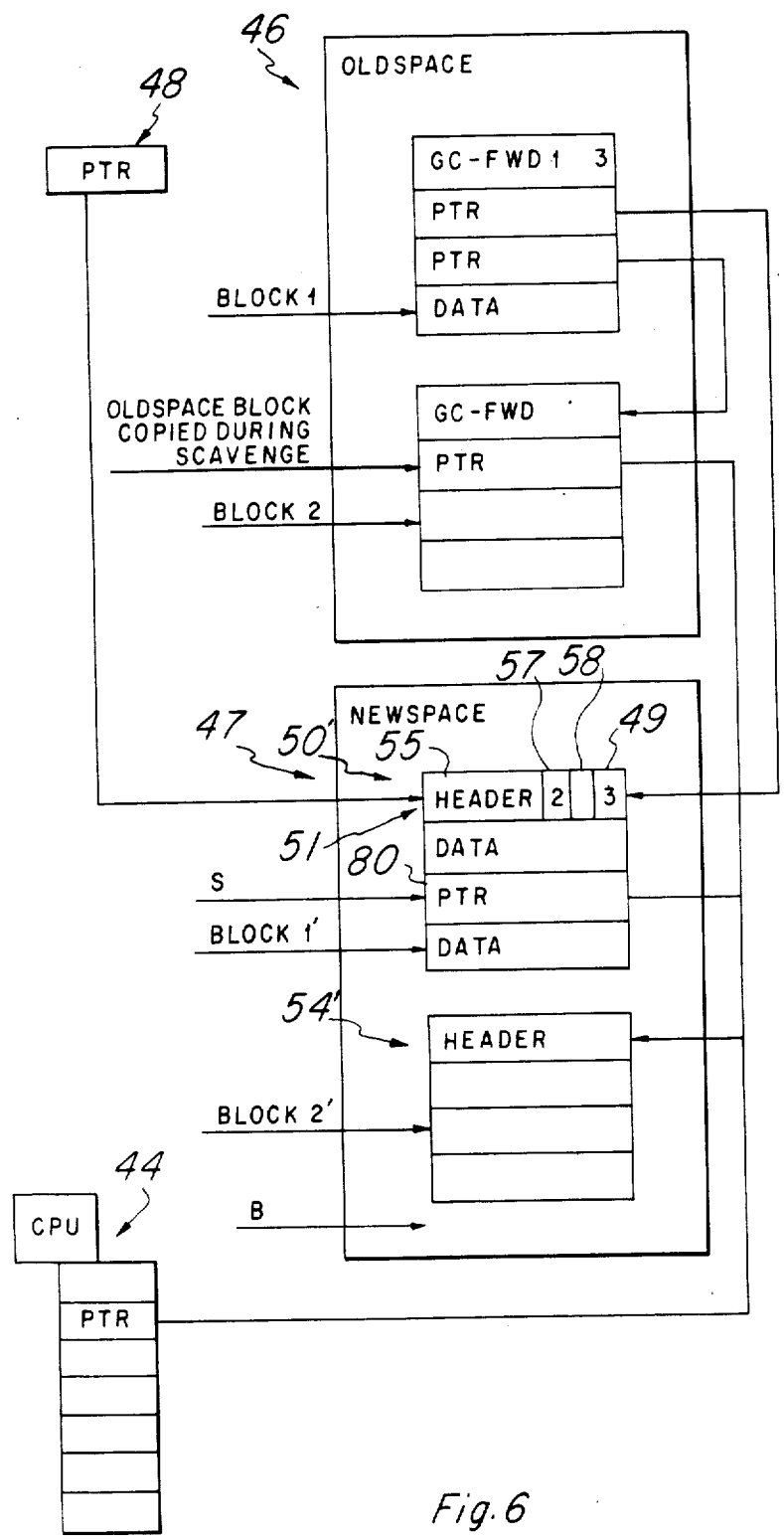
FIG. 6 shows a portion of the area of the virtual address space of FIG. 5, illustrating the manner by which the copied blocks in newspace are scavenged.

As mentioned, all objects which were copied to newspace during the trace phase are scanned, or "scavenged", to find and update any pointers in the cells of the newspace objects, and to copy all oldspace objects which are referenced by those pointers to newspace, if necessary. For example, the newspace object 50' in FIG. 4 has a cell 56 which points to an object 54 in oldspace 46. As the object 50' is scavenged, object 54 is copied to newspace at the "B" pointer, as shown in FIG. 6. The copying of the object 54' and the updating of the reference proceeds in the same manner as if the pointer originated from the root set of the generation, described above.

As shown in FIG. 6, when scavenging newspace 47 begins, an "S" pointer is initialized to point to the first cell of the newspace 47. The "S" pointer is then moved or sequenced through the cells of the newspace 47 looking for pointers, until it reaches the "B" pointer. (The "B" pointer is located one cell beyond the last object in newspace, as shown.) To determine whether an object need be scavenged, a scavenge bit 58 may be provided in the header cell 51, as shown. When the scavenge bit is found to be "on", the object with which it is associated is scavenged, and before the "S" pointer is advanced to the next cell, the scavenge bit is turned off. If the scavenge bit is found to be off in the first place, the "S" pointer is advanced to the next cell following the object, as determined by the object-size field 49, described above.

The use of a scavenge bit is desirable to avoid unnecessary scavenging, for instance, objects which have been allocated since garbage collection has begun, since no cells in such newly allocated objects will contain pointers in oldspace.

Once the newspace of the generation is scavenged, the promoted objects in the next older generation are scavenged. The cells are scavenged in the same way as the newspace of the younger generation, except the "S" pointer begins at the virtual address of the newspace of the older generation where the present collection of the younger generation began its promotion of objects (a younger generation may be garbage collected several times before the next older generation is garbage collected), and scans the cells until the "P" pointer, described below, is reached.

After the scavenge phase is complete, the oldspace 46 is cleaned. Although scavenging guarantees that all of the accessible objects of the generation being collected are in newspace 47, and that all references into the generation point to newspace objects, the oldspace of the generation still may contain several "trouble" pointers, referencing objects in other generations. Thus, during the cleaning oldspace phase, the TPLs for referent generations are purged of the entries for the virtual pages on which these "obsolete" pointers reside. This is the purpose of the cleaning oldspace phase.

The "cleanup oldspace phase" proceeds as a low-priority background process. Therefore, to ensure that some other generation under collection does not unnecessarily bring into main memory from disk or bulk memory an oldspace page to scan for these pointers when they are actually pointers from "garbage" cells, all oldspace pages on disk are marked in a page table as "trash" pages by means of a "trash" bit. Then, should another generation try to bring the page in for scanning during its trace phase, the "trash" bit indicates that the page should not be brought into memory; instead, the page reference is removed from the TPL of the generation.

As a part of the background cleaning process, and taking advantage of the page-in and page-out process above described, the oldspace pages on disk are brought in to main memory, and the cells on the page are initialized to destroy the pointers on the page. It will be appreciated that the TPLs containing the pages with "trouble" pointers are not immediately updated. It is not until the page would be paged out that the TPLs are updated (the actual oldspace page write to disk may be suppressed as being unnecessary, as the disk copy is obsolete).

In addition, all oldspace pages resident in main memory are also "cleaned". For example, the cells on such pages are reinitialized to a predetermined value, having the effect of writing over all "trouble" pointers in resident pages. The bits, corresponding to the oldspace pages resident in memory, in all bit-map TPLs are turned off.

As mentioned, when an object has survived a predetermined number of garbage collections, the object is "tenured" or promoted to the next older generation. Tenured objects are likely "long-lived" and, therefore, will probably not be reclaimed by the collector in the near future. Tenuring objects improves the speed with which a generation can be garbage collected.

To support tenuring, a "survival counter" 57 in the header cell 51 of each object is provided to indicate the number of times the object 50 has survived a garbage collection in a particular generation. Thus, when the object 50 is first allocated, its survival counter 57 is initialized. Then, each time the object 50 is copied in the same generation, its survival counter 57 is incremented. When the survival counter 57 reaches a predetermined count, the object 50 is promoted to the next older generation, and the survival counter 57 is reinitialized. The limit on the number of garbage collections an object endures before being promoted to the next older generation may vary among different generations or areas.

Figure 7:
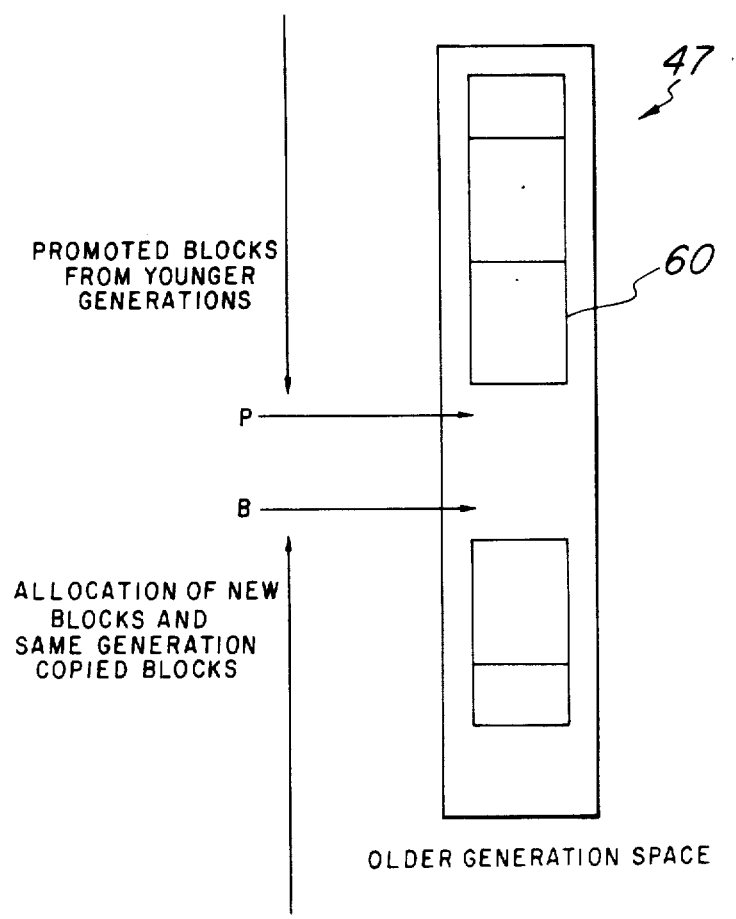
FIG. 7 shows a portion of the virtual memory space with which the method and apparatus in accordance with the invention can be used, illustrating the manner and enabling pointer structure by which a block is promoted.

An object is tenured to the newspace of the older generation rather than its oldspace to ensure that the object survives garbage collection of the older generation. It is also scavenged before the garbage collection of its former generation is complete. For this reason, promoted objects are kept separate from the allocated objects in the newspace of the next older generation. Thus, as shown in FIG. 7, an object 60 promoted from a younger generation is copied to a location indicated by a special pointer, "P", rather than the "B" pointer used for forwarding and allocating objects in the older generation 47. The pointer, "P", begins at the opposite end of newspace 47 from the pointer, "B", and both pointers move toward each other, as shown.

Although a promoted object 60 is copied to the next older generation at the pointer, "P", the copy is made as if it were a copy to the same generation; for example, the object 60 occupies a multiple of words of memory, does not ordinarily cross page boundaries, and has a gc-forward pointer left in the oldspace object. However, the generation number of the reference in the memory tag is incremented and the survival counter is reinitialized.

It will be understood that in some instances it will be desirable or necessary to provide a barrier (not shown) for writing pointers to oldspace objects, to enable incremental collection, so that a pointer to an oldspace object is not permitted to be written into the processor registers. Thus, in an incremental collector, an oldspace object pointer must be detected, and the object copied into newspace, then the pointer to the newspace address can be written into the register.

Although the invention has been described and illustrated with a certain degree of particularity, it is understood that the present disclosure has been made by way of example only and that numerous changes in the combination and arrangement of parts or steps may be resorted to by those skilled in the art without departing from the spirit and the scope of the invention as hereinafter claimed.

We claim:

1. A method for managing a virtual memory of a computer system, such virtual memory having a main memory and a backing store, and a plurality of virtual pages in each of the main memory and the backing store, comprising the steps of:
   (a) dividing the virtual memory into at least two areas, each area containing a plurality of pages, and capable of storing a plurality of objects;

(b) dividing each area into at least two generations, each generation containing a plurality of pages, and capable of storing a plurality of objects, wherein the generations in each area are ordered from youngest to oldest, with an older generation containing objects which have survived more garbage collection processes than those contained in a younger generation;

(c) for each generation within each area, providing a first trouble pointers data structure which identifies the locations of trouble pointers for that generation, wherein a trouble pointer is considered to be (1) a pointer from within the same area but originating from an older generation, or (2) a pointer originating from another area;

(d) providing a second trouble pointers data structure which indicates, for each page currently located in the main memory, whether that page has contained, since such page was last loaded into the main memory, any pointers which are trouble pointers for another generation or area;

(e) whenever a page is copied into the main memory from the backing store, scanning such page for pointers to other areas or younger generations within the same area, whereby any pointers so found are trouble pointers;

(f) for each page in which trouble pointers are found in step (e), providing a trouble pointers page-in list containing all trouble pointers which were found in step (e);

(g) whenever a page is copied from the main memory to the backing store, scanning such page for trouble pointers as in step (e), and comparing any trouble pointers so found with the trouble pointers page-in list provided in step (f);

(h) whenever step (g) indicates that a page being written to the backing store has different trouble pointers that when that page was copied into the main memory, updating the first trouble pointers data structures of the generations, which are referenced by those trouble pointers which have been changed; and (i) periodically performing garbage collection on generations within areas, wherein each such generation has a root set which includes all trouble pointers into that generation as defined by the corresponding first trouble pointers data structure, and wherein all pages which are indicated by the second trouble pointers data structure as having contained trouble pointers are scanned for trouble pointers which point to the generation being collected, with any such pointers being included in the root set thereof.

2. The method of claim 1, wherein the first trouble pointers data structure is a B-tree.

3. The method of claim 1, wherein the second trouble pointers data structure is a bit map.

4. The method of claim 1, wherein the second trouble pointers data structure contains a plurality of bit maps, with a bit map assigned to at least one selected generation, wherein the bit map assigned to such selected generation indicates which pages currently located in memory have contained trouble pointers which point into such selected generation, and wherein garbage collection performed on such selected generation in step (i) includes scanning the bit map assigned to such selected generation for pointers to be included in the root set thereof.

5. The method of claim 4, further including providing an active generations table which indicates which generations within areas are selected generations and therefore have an assigned bit map.

6. The method of claim 4, wherein the second trouble pointers data structure further includes a default bit map which indicates which pages currently located in memory have contained trouble pointers which point only into non-selected generations which do not have an assigned bit map, and wherein garbage collection performed on such non-selected generations in step (i) includes scanning the default bit map for pointers to be included in the root set thereof.

7. The method of claim 1, wherein step (k) utilizes a copying garbage collector.

8. The method of claim 1, wherein step (h) comprises:
(h.1) for trouble pointers which are contained in the page being written out to the backing store and which are not contacted in the trouble pointers page-in list for that page, identifying such trouble pointers in the first trouble pointers data structures for the generations within areas to which such trouble pointers point;
(h.2) for trouble pointers which are contained in the trouble pointers page-in list for a page and which are not contained in that page when it is written out to the backing store, deleting references thereto from the first trouble pointers data structures for the generations within areas to which such trouble pointers contained only in the trouble pointers page-in list point; and
(h.3) for trouble pointers which are contained in the trouble pointers page-in list for a page and which are also contained in that page when it is written out to the backing store, making no changes to any first trouble pointers data structures.

9. A garbage collectible memory for a computer system, comprising:
a virtual memory having a plurality of pages, such virtual memory implemented as a main memory backed by a backing store wherein pages are copied from the backing store to main memory and from the main memory to the backing store;
at least two areas, each area containing a plurality of virtual memory pages;
at least two generations within each area, each generation containing a plurality of virtual memory pages, wherein the generations within each area are ordered from youngest to oldest, with an older generation within an area containing memory objects which have survived more garbage collection processes than those contained in a younger generation;
a first trouble pointers data structure within each generation which identifies trouble pointers into that generation, wherein a trouble pointer is considered to be (1) a pointer from within the same area but originating from an older generation, or (2) a pointer originating from another area;
a second trouble pointers data structure which indicates, for each page currently located in the main memory, whether such page has contained, since such page was last copied into the main memory, any pointers which are trouble pointers for another generation or area;
a trouble pointers page-in list containing all trouble pointers which were located in each page in the main memory at the time such pages were copied into main memory from the backing store;

a trouble pointers page-out list containing all trouble pointers located in a page currently being copied from the main memory to the backing store;

means connected to said trouble pointers page-in list and to said trouble pointers page-out list for updating the first trouble pointers data structures of those generations in which trouble pointers have changed between the page-in list and the page-out list for the page currently being copied from main memory to the backing store; and a copying garbage collector which collects each generation of each area independently, wherein a root set of any generation being collected includes any pointers contained in the first trouble pointer data structure of such generation, and any pointers contained in pages in main memory which are indicated by said second trouble pointers list as containing trouble pointers and which point into such generation being collected.

10. The method of claim 9, wherein the first trouble pointers data structure is a B-tree.

11. The method of claim 9, wherein the second trouble pointers data structure is a bit map.

* * * * *